(12) United States Patent
Nishimura et al.

(10) Patent No.: US 7,684,298 B2
(45) Date of Patent: Mar. 23, 2010

(54) OPTICAL INFORMATION RECORDING METHOD AND OPTICAL INFORMATION RECORDING APPARATUS

(75) Inventors: Koichiro Nishimura, Yokohama (JP); Atsushi Yamada, Saitama (JP); Toru Kawashima, Mito (JP); Tsuyoshi Toda, Kodaira (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 746 days.

(21) Appl. No.: 11/493,035

(22) Filed: Jul. 26, 2006

(65) Prior Publication Data

US 2007/0189140 A1 Aug. 16, 2007

(30) Foreign Application Priority Data

Feb. 14, 2006 (JP) .............................. 2006-035907

(51) Int. Cl.
G11B 7/00 (2006.01)
(52) U.S. Cl. ................................. 369/47.53; 369/47.52
(58) Field of Classification Search .............. 369/47.52, 369/47.53
See application file for complete search history.

(56) References Cited

U.S. PATENT DOCUMENTS

| 7,423,945 | B2* | 9/2008 | Ueki ........................ 369/47.53 |
| 2002/0003760 | A1* | 1/2002 | Honda ...................... 369/47.52 |
| 2003/0036861 | A1* | 2/2003 | Matsumoto .................. 702/60 |
| 2003/0107642 | A1* | 6/2003 | Nagano ....................... 347/246 |
| 2004/0160874 | A1* | 8/2004 | Hwang et al. ............. 369/47.53 |
| 2005/0163007 | A1* | 7/2005 | Ueki ........................ 369/47.53 |
| 2005/0207298 | A1* | 9/2005 | Seino ....................... 369/47.52 |
| 2006/0013089 | A1* | 1/2006 | Kobayashi et al. ........ 369/47.53 |
| 2008/0212429 | A1* | 9/2008 | Ueki ........................ 369/47.53 |
| 2009/0028028 | A1* | 1/2009 | Watanabe et al. ............. 369/94 |

FOREIGN PATENT DOCUMENTS

| JP | 2003-085753 | 3/2003 |
| JP | 2003-123255 | 4/2003 |
| WO | WO 03/046898 A1 | 6/2003 |
| WO | WO 2005/064599 A1 | 7/2005 |

OTHER PUBLICATIONS

Chinese Office Action issued in Chinese Patent Application No. CN 2006101265217, dated Mar. 7, 2008.

* cited by examiner

Primary Examiner—Thang V Tran
Assistant Examiner—Brenda Bernardi
(74) Attorney, Agent, or Firm—McDermott Will & Emery LLP

(57) ABSTRACT

Means is provided that produces stabilized trial write results when, for example, servo misalignments are caused due to deviations on an optical disc that requires trial writes at high linear velocity. A recording method produces a recording parameter in the event of recording information into an arbitrary address position in the manner that a recording parameter is obtained through a predetermined calculation method from the results of learning of recording parameters on two or more zones of the optical disc where the linear velocities are different form one another. In a zone where the linear velocity is low, the method determines an optimal recording parameter from a jitter value of a reproduced signal waveform generated in a trial write. In a zone where the linear velocity is high, the method determines an optimal recording parameter in accordance with information obtainable from an amplitude value of a reproduced signal generated in a trial write.

6 Claims, 7 Drawing Sheets

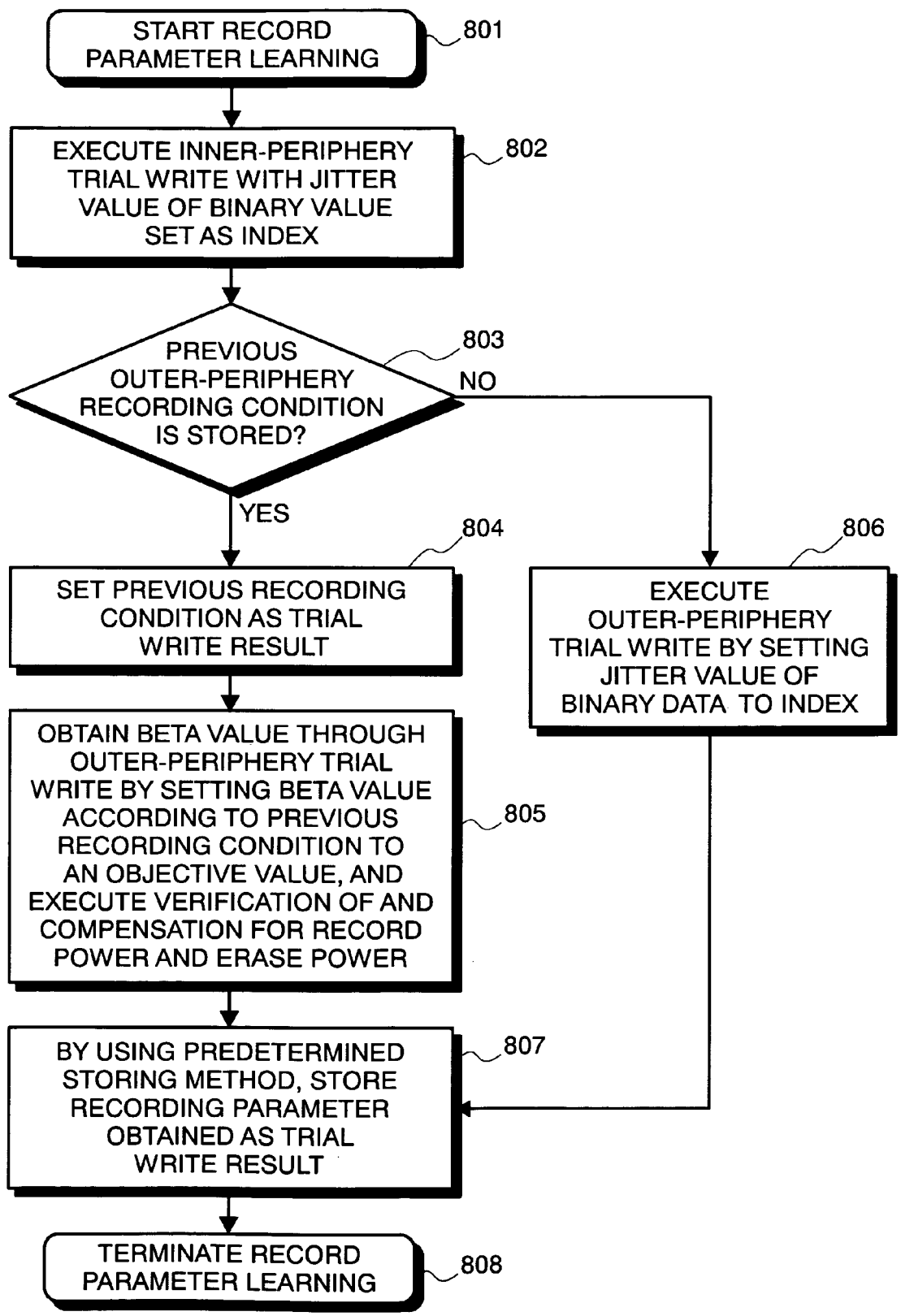

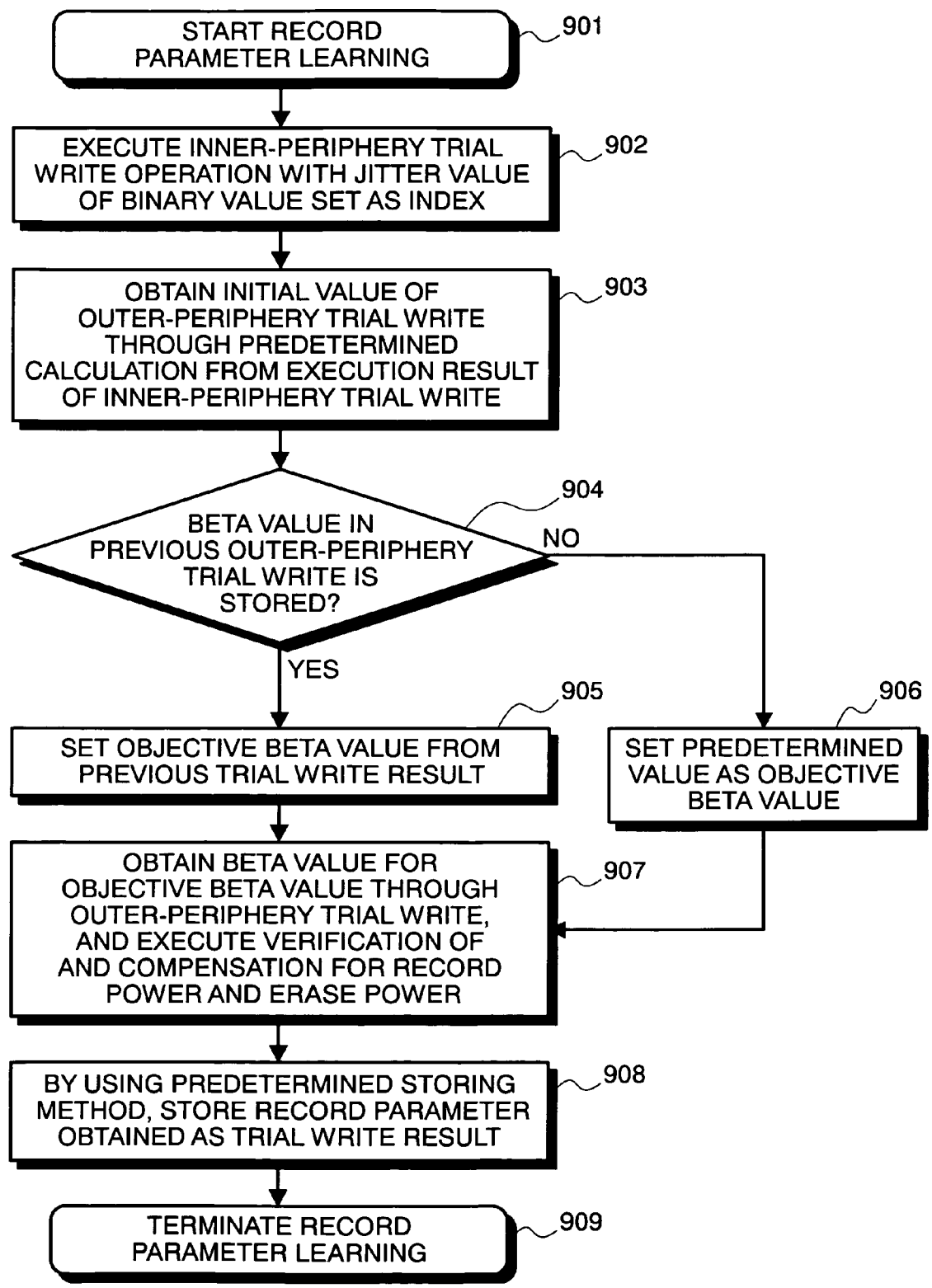

OPTICAL INFORMATION RECORDING METHOD AND OPTICAL INFORMATION RECORDING APPARATUS

CLAIM OF PRIORITY

The present application claims priority from Japanese application serial no. JP 2006-35907, filed on Feb. 14, 2006, the content of which is hereby incorporated by reference into this application.

BACKGROUND OF THE INVENTION

1. Field of the Invention

The present invention relates to a technique of recording information onto an optical disc by using laser beams, for example.

2. Description of the Related Art

Optical-disc rotation control schemes generally used include two types, namely, a CLV (constant linearly velocity) control scheme, which is executed in a constant linear velocity mode, and a CAV (constant angular velocity) control scheme, which is executed in a constant angular velocity mode.

In the CLV control, the optical-disc rotational velocity increases toward the inner periphery, such that it is difficult to enhance the recording/reproducing speeds by using the CLV scheme. As such, with increased recording/reproducing speeds, there is employed the CAV control scheme that enables enhancement in the linear velocity in the outer periphery portion.

In addition, generally, in the case that information is recorded by using marks and spaces, the emission power and emission time of laser light are finely controlled to enhance mark-forming accuracy. Such a control scheme is called a "write strategy."

The write strategy is variable depending on the linear velocity in the event of recording onto the optical disc through the CAV control, so that the linear velocity of the optical disc is different depending on the radial position of the optical disc. For this reason, record parameters of the write strategy, such as the amounts of control of emission power and emission time of the pulse, have to be specified corresponding to the respective radial position.

Further, characteristics such as those in rising and falling of recording laser light irradiated from lasers are slightly different depending on the respective laser, so that the write strategy has to be adjusted corresponds to each optical disc recording apparatus. As shown and described in Japanese Unexamined Patent Application Publication No. 2003-85753, in a CAV recording apparatus, record parameter learning is carried out on the innermost periphery and the outermost periphery, and record parameters in an inbetween radial position are obtained by interpolating, such as linear interpolation, from both learning results.

Generally, however, during the manufacturing process, there occur many cases in which nonuniformity of a recording layer, distortion of optical disc recording grooves, and the like occur in outer periphery portions of the optical disc. As such, when high speed recording is carried out through the CAV scheme, there occurs a noise higher than a servo band in the outer periphery portion. Any one of the aforementioned the recording layer thickness nonuniformity and the recording groove distortion, herebelow, will be referred to as deviation. The deviation causes recording failure and reproducing failure because of servo swings in the outer periphery portion.

For this reason, in the high speed CAV recording, when record parameter learning is carried out on the outer periphery portion with deviation, an inappropriate record parameter is likely to be learned to be an optimal record parameter. Especially, according to DVD-RAM standards, it is recommended that jitter corresponding to fluctuation of an edge component of a recording mark or space is set as an index in a record parameter learning scheme. As such, in the event that the S/N ratio is deteriorated due to recording failure as a result of the deviation, acquirement of the record parameters is significantly influenced, increasing the probability that an inappropriate record parameter is learned to be optimal.

As a method of preventing such the problem, a method is known that calculates a record parameter being employed in the event of recording at high linear velocity on an outer periphery zone by carrying out a predetermined calculation on a record parameter obtained from the result of a trial write of an inner periphery zone (see Japanese Unexamined Patent Application Publication No. 2003-123255).

SUMMARY OF THE INVENTION

However, there remains a problem in that, because of influences of conditions of focus and tracking servos or the optical disc tilt, in the event of the high speed recording, the optimal record parameter cannot be obtained in the manner of prediction of the optimal record parameter through the calculation from the result of the inner periphery trial write.

In addition, a problem exists with the conventional manner of the optimal record parameter prediction through the calculation from the result of the inner periphery trial write. The problem is that since a recode power margin of the optical disc is likely to decrease as the recording linier velocity increases, it is difficult to set a record power in a record power margin in the outer periphery zone in the conventional manner.

In order to solve the problems described above, the present invention provides an optical information recording method for recording information onto a rewritable optical disc, which is used for information recording, in a manner that laser light is irradiated on a recording layer of the optical disc to thereby form marks thereon. The method comprises, in a zone of the optical disc where a linear velocity is low, determining an optimal recording parameter of a record wavelength at the linear velocity in accordance with a jitter value of a reproduced signal generated in a trial write; in a zone of the optical disc where the linear velocity is high, determining an optimal recording parameter of a record wavelength at the linear velocity in accordance with information obtainable from an amplitude value of a reproduced signal generated in a trial write; and determining an optimal recording parameter of a record wavelength in the event of recording information into an arbitrary address position is determined in a manner that a recording parameter is obtained through a predetermined calculation method from results of learning of optimal recording parameters on two or more zones of the optical disc where the linear velocities are different form one another.

Further, the present invention provides an optical information recording method for recording information onto a rewritable optical disc, which is used for information recording, in a manner that laser light is irradiated on a recording layer of the optical disc to thereby form marks thereon. The method comprises, in a zone of the optical disc where a linear velocity is low, determining an optimal recording parameter of a record wavelength at the linear velocity in accordance with a jitter value of a reproduced signal generated in a trial write; in a zone of the optical disc where the linear velocity is high, determining an optimal recording parameter of a record wavelength at the linear velocity in accordance with information obtainable from an amplitude value of a reproduced signal generated in a trial write that is executed with a recording parameter obtained by predetermined calculation circuit from the result of learning of the recording parameter obtained in the zone where the linear velocity is low; and determining an optimal recording parameter of a record wavelength in the event of recording information into an arbitrary address position is determined in a manner that a recording parameter is obtained through a predetermined calculation method from results of learning of optimal recording parameters on two or more zones of the optical disc where the linear velocities are different form one another.

The present invention further provides an optical information recording method for recording information onto a rewritable optical disc, which is used for information recording, in a manner that laser light is irradiated on a recording layer of the optical disc to thereby form marks thereon. The method comprises, in a zone of the optical disc where a linear velocity is low, determining an optimal recording parameter of a record wavelength at the linear velocity in accordance with a jitter value of a reproduced signal generated in a trial write; in a zone of the optical disc where the linear velocity is high, determining an optimal recording parameter of a record wavelength at the linear velocity in accordance with information obtainable from an amplitude value of a reproduced signal generated in a trial write that is executed with a recording parameter determined from the result of a previous trial write executed at the linear velocity on the optical disc; and an optimal recording parameter of a record waveform in the event of recording information into an arbitrary address position is determined in a manner that a recording parameter is obtained through a predetermined calculation method from results of learning of optimal recording parameters on two or more zones of the optical disc where the linear velocities are different form one another.

BRIEF DESCRIPTION OF THE DRAWINGS

In the accompanying drawings,

FIG. 8 is an execution flowchart of a trial write according to a second embodiment of the present invention; and FIG. 9 is an execution flowchart of a trial write according to a third embodiment of the present invention.

DETAILED DESCRIPTION OF THE PREFERRED EMBODIMENTS

Embodiments of the present invention will be described herebelow.

First Embodiment

A first embodiment will be described with reference to an example of a DVD-RAM disc.

Figure 1:
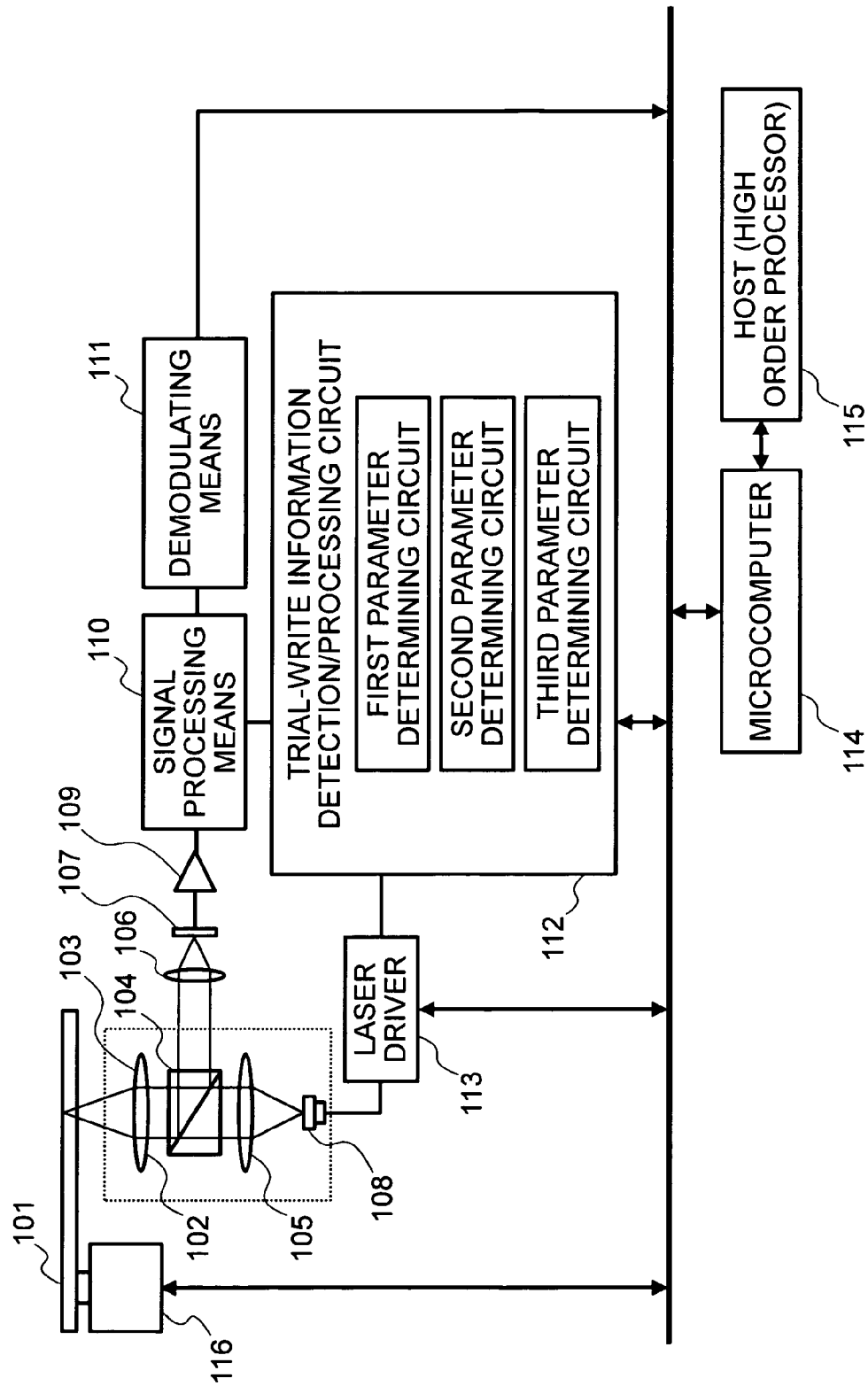
FIG. 1 is a view showing an example of an apparatus configuration according to the first embodiment of the present invention.

FIG. 1 shows the configuration of an optical information recording apparatus according to the present embodiment. With reference to the drawing, laser light emitted from a laser 108 is irradiated onto a specified radial position of an optical disc 101, such as a DVD-RAM, through a collimate lens 105 and an objective lens 103. Reflected light from the optical disc 101 is converged through a converging lens 106 through a beam splitter 104, and then is converted into an electric signal (simply "signal," hereafter) by a photoelectric transducer 107. The signal thus obtained is decoded by demodulating circuit 111 through I/V converting circuit 109 and signal processing circuit 110. Then, the signal is transferred to a host 115 (higher order processor) through a microcomputer 114. Numeral 116 denotes a motor that rotational drives the optical disc in accordance with control by the microcomputer 114.

In a trial write, a reproduced signal is transferred to a trial-write information detection/processing circuit 112 from the signal processing circuit 110. In accordance with the processing result of the trial-write information detection/processing circuit 112, a record parameter value for setting the strategy for the laser driver 113 is determined. The trial-write information detection/processing circuit 112 is inclusive of a first parameter determining circuit, a second parameter determining circuit, and a third parameter determining circuit. These circuits will be described in detail below. In accordance with the parameter value, reproduce of a recording result and transfer thereof to the trial-write information detection/processing circuit 112 are repeated, thereby to obtain an optimal record parameter value.

Figure 2:
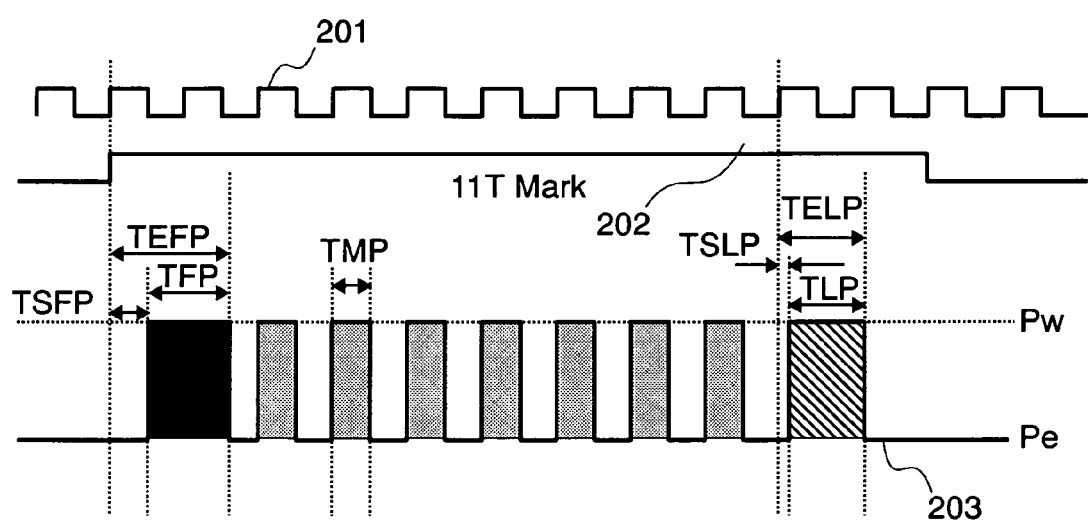
FIG. 2 is a view showing a recording pulse (pulse train) of a DVD-RAM (or, "DVD-RAM disc," hereafter)
Figure 3:
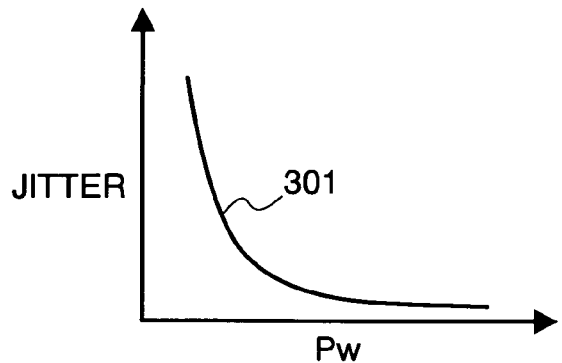
FIG. 3 is a schematic diagram showing an example of the relationship between a record power and jitter.

FIG. 2 shows an example of a record waveform of the DVD-RAM. Numeral 201 denotes a recording clock, numeral 202 denotes an NRZ (non-return to zero) signal, and numeral 203 denotes a laser emission waveform. In the trial write, position information of a record power Pw, an erase power Pe and pulse edges TSFP and TELP are optimized through record learning. According to the standards, it is recommended that the optimization be assessed from jitter between a binary recording waveform and a reproducing clock. For example, the record power Pw and the jitter (value) are interrelated as shown in FIG. 3, and an optimal power is obtained from a curve 301 that represents the relationship between record power Pw and the jitter value.

Figure 4:
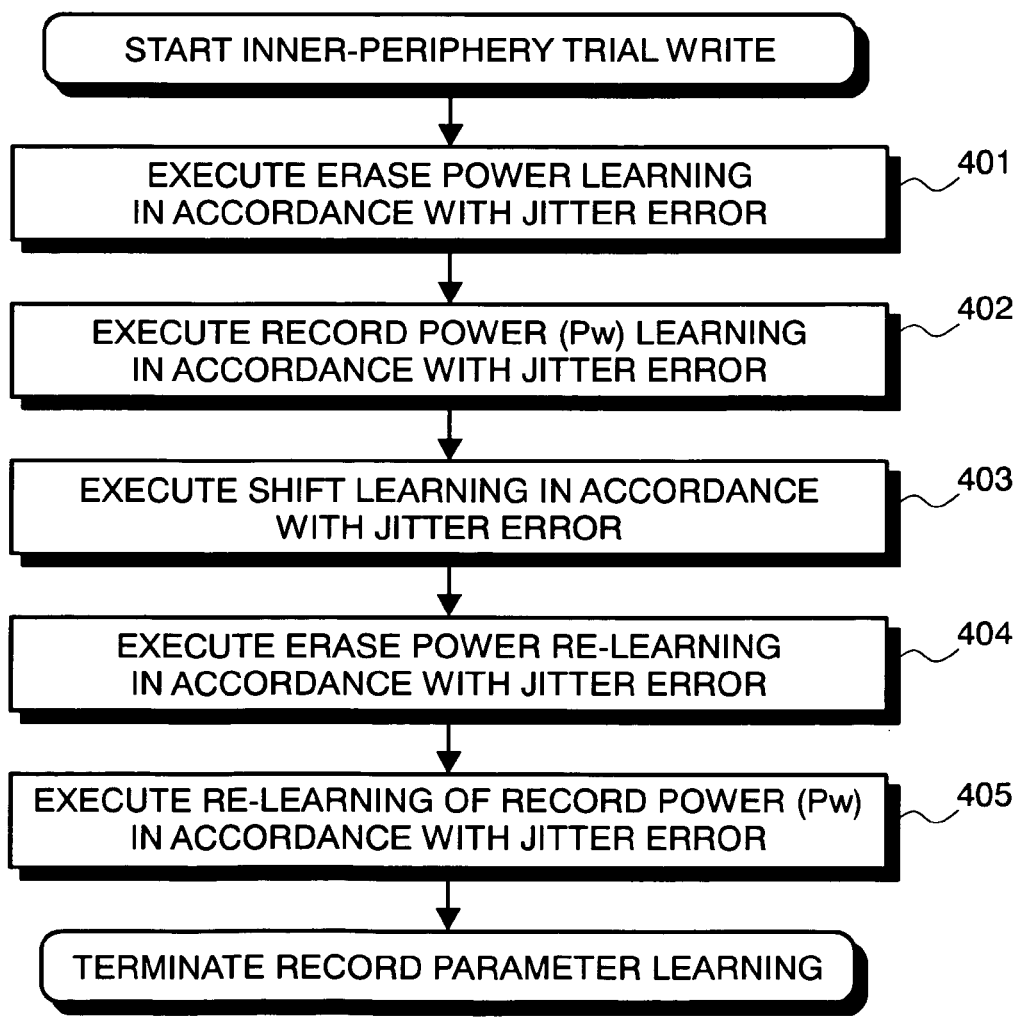
FIG. 4 is a diagram showing an example of the execution content of a trial write.

FIG. 4 shows a processing sequence of the trial write. First, learning (process) (step 401) of an erase power Pe and learning of a record power Pw are executed (step 402), and then a basic recording strategy is determined through learning of a pulse edge position (step 403) ("shift learning," hereafter). Then, re-learning of the erase power Pe (step 404) and re-learning of the record power Pw (step 405) are executed, thereby to determine a record parameter. Then, the processing terminates.

Figure 5:
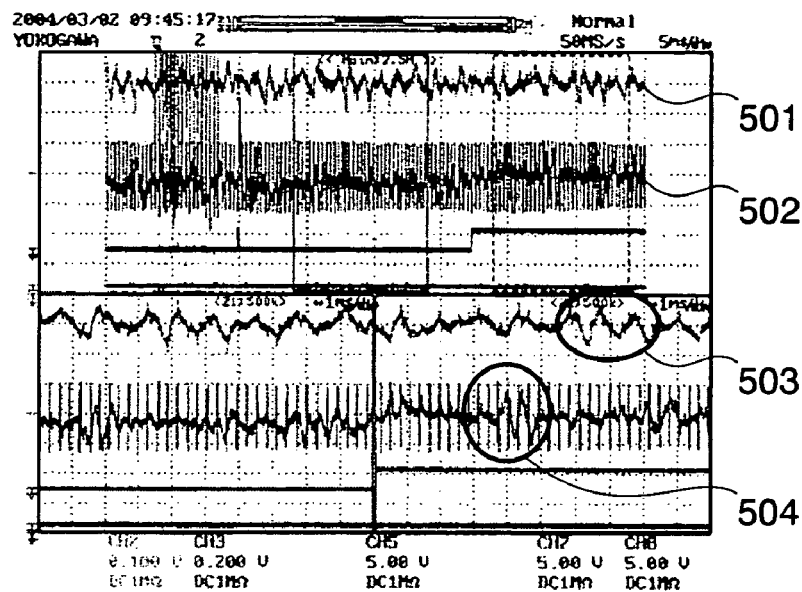
FIG. 5 is a view showing servo misalignments on account of deviations.

FIG. 5 shows a survey map of a servo waveform in during high double speed recording. In FIG. 5, numeral 501 denotes a focus error signal, and numeral 502 denotes a tracking error signal. Numeral 503, 504 denotes a servo signal swing resulting from deviations caused by optical disc forming. As the reproducing speed increases, the swing band proportionally increases; and when the servo swing increases greater than the servo band, it cannot be restrained through servo control. In the event that the deviation occurs in reproduce of record data of the optical disc, error is caused with binary data due to amplitude fluctuations of a reproduced signal. Thereby, the result of the trial, for example, cannot be properly assessed.

Further, there are imposed adverse effects causing turbulences of the recording signal in the portion where the deviation has occurred. As such, in the event the deviation has occurred in a test zone, a record parameter determined in accordance with the result of a trial write executed therein is low in reliability.

More specifically, a technique is known in which, in the CAV recording being performed on a DVD-RAM, record parameters are learned in respective drive test zones provided on an innermost periphery and an outermost periphery. For the midway portion, parameters are calculated by interpolating, such as linear interpolating, from the results of learning on the innermost periphery and the outermost periphery. However, in the CAV recording, the linear velocity on the outer periphery is higher than that on the inner periphery, such that it is likely to be influenced by the deviation, thereby to make it difficult to properly learn record parameters. As such, a technique has been proposed that obtains an outer-periphery record parameter through a predetermined calculation performed in accordance with the result of the trial write in an inner periphery. Generally, however, a record strategy is substantially analogous with the linear velocity. As such, although pulse edge position information can be obtained in the above-described technique, it is difficult to obtain an optimal record power only through the calculation because of, for example, the deviations or recording layer nonuniformity across the outer periphery zone. Further, since the recording linier velocity increases on the outer periphery, sensitivity to the record power of the recording layer of the optical disc increases, and an allowable amount ("record power margin," hereafter) for the record power deviation decreases. From this fact also, a case can take place in which sufficient accuracy cannot be obtained only by performing the calculation of the outer-periphery record parameter in accordance with the inner-periphery learning result.

Figure 6:
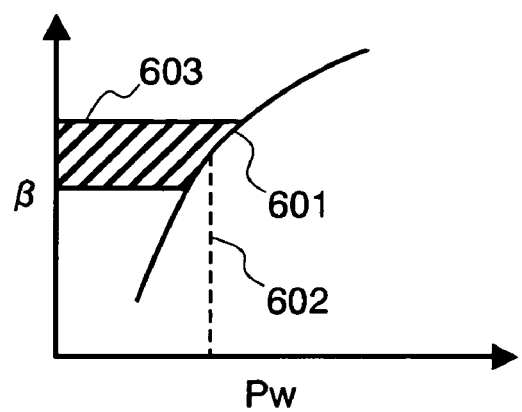
FIG. 6 is a schematic view showing an example of the relationship between the record power and beta value.

Taking this problem into account, the present embodiment is made such that, in the trial write onto the outer-periphery zone where the linear velocity increases, the record power assessment is carried out without using the binary signal but with using either asymmetry information of the reproduced signal or a beta value of the reproduced signal. For example, as shown in FIG. 6, the relationship between the record power Pw and the beta value of the reproduced signal is represented as a monotonical increase. As such, a process is carried out to obtain a beta value of the reproduced signal in the event that an outer-periphery record power value Pout 602 obtained from, for example, the result of an inner-periphery trial write through a predetermined calculation. Then, it is verified whether the beta value thus obtained falls within a range of preset, predetermined values. If the beta value does not fall within the range of predetermined beta values, then the record power is compensated for to fall within the range of beta values.

Figure 7:
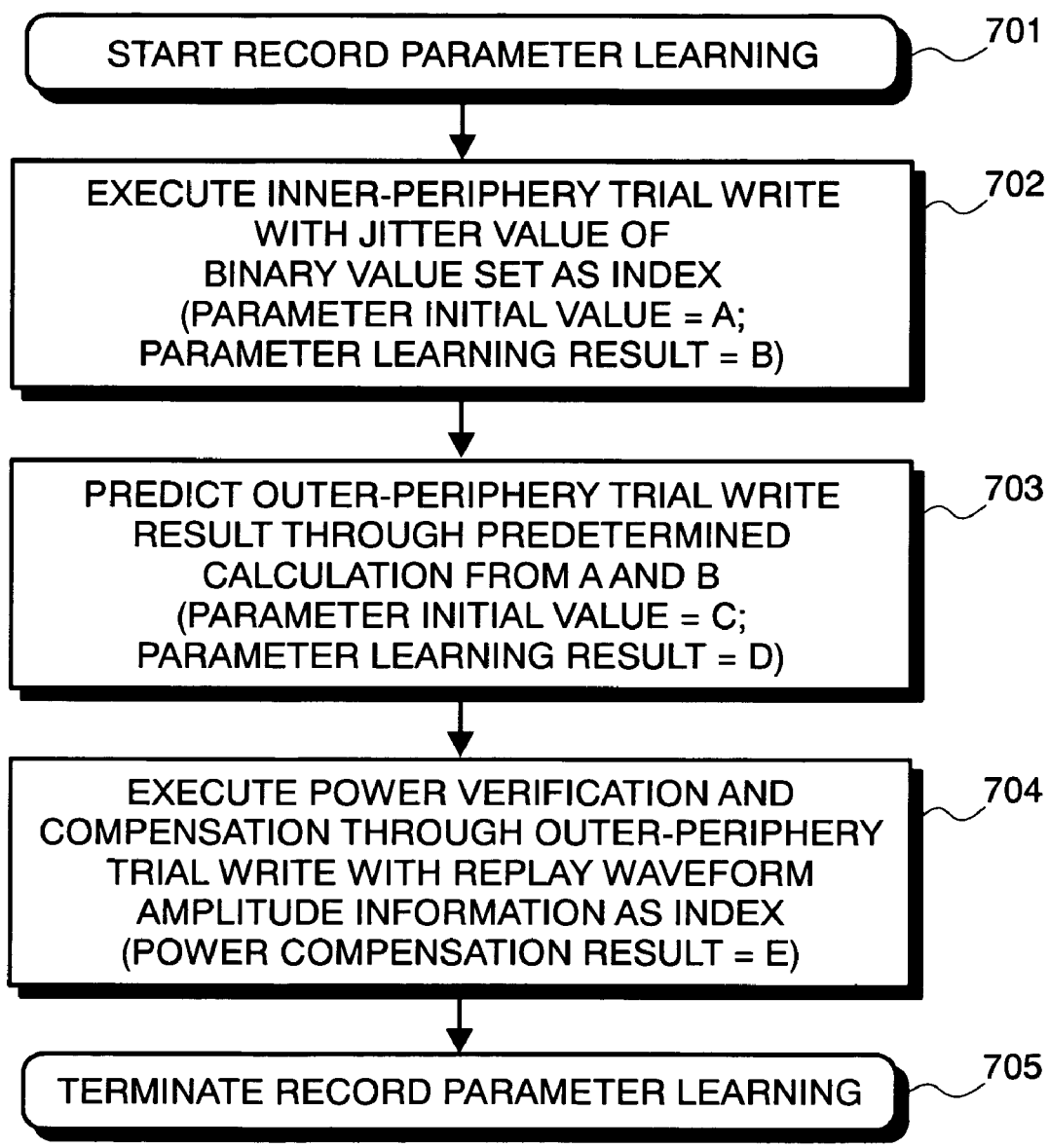
FIG. 7 is an execution flowchart of the trial write according to the first embodiment.

FIG. 7 shows a processing sequence of record power learning in a CAV recording scheme according to the present embodiment. Operation of the processing sequence will be described herebelow.

1. Record parameter learning is started (step 701).

2. An inner-periphery trial write is executed with the jitter value of binary data set as the indicator (step 702). As a consequence, a parameter learning result B on the inner periphery is obtained with respect to a parameter initial value A on the inner periphery.

3. Through the predetermined calculation, an outer-periphery trial write result is predicted from the parameters A and B (step 703). As a consequence, a parameter learning result D on the outer periphery is obtained with respect to a parameter initial value C.

4. By using the second parameter determining circuit, record power verification and compensation through the outer-periphery trial write are executed with reproduced signal amplitude information (value) set as the index (step 704). As a consequence, a power compensation result E is obtained.

5. The record parameter learning terminates (step 705).

In the above, any one of the asymmetry value and beta values used as the index in the outer-periphery trial write is a relative value of compression information of the reproduced signal. As such, even in the event that amplitude fluctuations of the reproduced signal is caused by the deviation or the like, the record power can be stably assessed by comparison with the assessment of the jitter value of the binary signal of the reproduced signal used in the inner periphery trial write. In addition, obtainment accuracy of the optimal record power value on the outer periphery can be improved.

In accordance with the respective optimal record power values thus obtained on the inner and outer peripheries, the third parameter determining circuit obtains an optimal record parameter at arbitrary linear velocity and recording position. Thereby, well suited record quality can be attained even at arbitrary linear velocity and recording position.

Second Embodiment

A second embodiment of the present invention will be described herebelow. The configuration of an optical information recording apparatus according to the second embodiment is similar to the optical information recording apparatus according to the first embodiment, so that repetitious descriptions thereof are omitted herefrom. The first embodiment describes a method that performs the verification of and compensation for the record power on the outer periphery by using the values dependent on the amplitude value of the reproduced signal, more specifically, the asymmetry value and the beta value. However, for the rewritable optical disc such as the DVD-RAM, the record power Pw and the erase power Pe have to be learned. For the erase power, record quality after overwrite recording performed onto a zone where the base has been recorded has to be verified, such that it is difficult to determine the difference between the base record waveform and the overwritten record in accordance with the amplitude information values of the reproduced signal.

DVD-RAM discs have a zone (disc information zone: DIZ) capable of recording drive-specific information. By recording the result of a trial write executed with an arbitrary apparatus onto a DIZ of an optical disc, the information (trial write result) recorded on the DIZ can be utilized in the case that the same optical disc is inserted into the same apparatus.

As such, in the event that an unused optical disk is inserted into an optical information recording apparatus, a trial write by assessment of jitter of the binary signal is executed similarly as on the inner periphery, thereby to learn the record power Pw and the erase power Pe. In this event, also the amplitude information value, such as asymmetry or beta value, associated with the record power and erase power according to the outer-periphery learning results. These results are recorded onto the DIZ after trial write.

FIG. 8 shows a processing sequence in the case where a same optical disc is inserted again into an optical information recording apparatus. The following describes the processing sequence.

1. Record parameter learning is started (step 801).
2. An inner-periphery trial write is executed with the jitter value of binary data set as the index (step 802).
3. It is verified whether the record parameter learning result obtained through a previous outer-periphery trial write is stored in the DIZ (step 803).
4. If stored, then the outer-periphery record parameter learning result described in the DIZ is set as an outer-periphery trial write result (step 804). Then, verification of the record power and the erase power and compensation through the outer-periphery trial write are executed with reproduced signal amplitude information (value), such as beta, set as the index (step 805).
5. If not stored (at step 803), similarly as in the case of the inner periphery, an outer-periphery trial write is executed with the jitter value of the binary data set as the index (step 806).
6. The trial write result is stored in a predetermined storing method (step 807).
7. The record parameter learning terminates (step 808).

According to the processing sequence, the accurate (detailed) record power and erase power are learned in sequence 5 (step 806) when the optical disc has been firstly inserted into the optical information recording apparatus. Consequently, the outer-periphery erase power learning result can be easily and accurately obtained. Further, in this event, an optimal ratio (Pw-Pe ratio) between the record power can be obtained. Accordingly, in sequence 4 of learning the record power and the erase power in sequence 4 the record power and the erase power can be verified and compensated for in the manner that the beta value is verified by fixing the Pw-Pe ratio.

For the predetermined storing method in sequence 6 (step 807), various methods can be contemplated. Employable methods include, for example, a method in which record parameters are stored into, for example, a predetermined zone of the optical disc, and the stored record parameters are read in the subsequent trial write execution. Another method is such that record parameters are stored into an internal memory of the optical information recording apparatus, the stored record parameters are read in the subsequent trial write execution.

In the present embodiment, while the stored value of the previous trial write result is used in the outer-periphery trial write, the previous trial write result may be used as an initial value in the inner-periphery trial write. Thereby, the inner-periphery record power and erase power can be verified and compensated for.

Third Embodiment

A third embodiment of the present invention will be described herebelow. The configuration of an optical information recording apparatus according to the third embodiment is similar to the optical information recording apparatus according to the first embodiment, so that repetitious description thereof is omitted herefrom. The following described the processing sequence.

1. Record parameter learning is started (step 901).
2. An inner-periphery trial write is executed with the jitter value of binary data set as the index (step 902).
3. An initial value of an outer-periphery trial write is obtained through a predetermined calculation from the execution result of the inner periphery trial write (step 903).
4. It is verified whether a beta value obtained in the previous outer-periphery trial write is stored (step 904).
5. If stored, the stored beta value is set as an objective value (step 905).
6. If not stored, a predetermined beta value is set as an objective value (step 906).
7. In response to the objective beta value having been set, a beta value is obtained through an outer-periphery trial write, and verification of and compensation for the record power and the erase power is executed (step 907).
8. The beta value obtained as a result of the trial write is stored (step 908).
9. The record parameter learning terminates (step 909).

For the predetermined storing method in sequence 8 (step 908), the same storing method as that in sequence 6 of the second embodiment can be used.

According to the present embodiment, in the optical disc or the optical information recording apparatus, even when a sufficient zone capable of storing record parameters is not secured, only beta values obtained in the event of reproduce of record waveform associated with record parameters of trial write results are stored. Consequently, stabilized record parameter learning can be accomplished on outer periphery zones, and record powers and erase powers can be verified and compensated for thereby.

FIG. 1
110 Signal processing circuit
111 Demodulating circuit
112 Trial-write information detection/processing circuit
  First parameter determining circuit
  Second parameter determining circuit
  Third parameter determining circuit
113 Laser driver
114 Microcomputer
115 Host (high order processor)

FIG. 3

Jitter

FIG. 4

Start Inner-Periphery Trial Write
401 Execute erase power learning in accordance with jitter error
402 Execute erase power learning in accordance with jitter error
403 Execute shift learning in accordance with jitter error
404 Execute erase power re-learning in accordance with jitter error
405 Execute record power (Pw) re-learning in accordance with jitter error
Terminate Record Parameter Learning FIG. 7
701 Start record parameter learning
702 Execute inner-periphery trial write with jitter value of binary value set as index (parameter initial value=A; parameter learning result=B)
703 Predict outer-periphery trial write result through predetermined calculation from A and B (parameter initial value=C; parameter learning result=D)
704 Execute power verification and compensation through outer-periphery trial write with reproduced signal amplitude information as index (power compensation result=E)
705 Terminate record parameter learning FIG. 8
801 Start record parameter learning
802 Execute inner-periphery trial write with jitter value of binary value set as index
803 Previous outer-periphery recording condition is stored?
804 Set previous recording condition as trial write result 805 Obtain beta value through outer-periphery trial write by setting beta value according to previous recording condition to objective value, and execute verification of and compensation for record power and erase power 806 Execute outer-periphery trial write by setting jitter value of binary data to index 807 By using predetermined storing method, store recording parameter Obtained as trial write result 808 Terminate record parameter learning

FIG. 9

901 Start record parameter learning

902 Execute inner-periphery trial write operation with jitter value of binary value set as index 903 Obtain initial value of outer-periphery trial write through predetermined calculation from execution result of inner-periphery trial write 904 Beta value in previous outer-periphery trial write is stored?

905 Set objective beta value from previous trial write result

906 Set predetermined value as objective beta value

907 Obtain beta value for objective beta value through outer-periphery trial write, and execute verification of and compensation for record power and erase power 908 By using predetermined storing method, store record parameter obtained as trial write result 909 Terminate record parameter learning

What is claimed is:

1. An optical information recording method for recording information onto a rewritable optical disc, which is used for information recording, in a manner that laser light is irradiated on a recording layer of the optical disc to thereby form marks thereon, the method comprising:

in a zone of the optical disc where a linear velocity is low, determining an optimal recording parameter of a record waveform at the linear velocity in accordance with a jitter value of a reproduced signal generated in a trial write;

in a zone of the optical disc where the linear velocity is high, determining an optimal recording parameter of a record waveform at the linear velocity in accordance with information obtainable from an amplitude value of a reproduced signal generated in a trial write that is executed with a recording parameter determined from the result of a previous trial write executed at the linear velocity on the optical disc; and determining an optimal recording parameter of a record waveform in the event of recording information into an arbitrary address position in a manner that a recording parameter is obtained through a predetermined calculation method from results of learning of optimal recording parameters on two or more zones of the optical disc where the linear velocities are different from one another.

2. An optical information recording method according to claim 1, wherein, as the information obtainable from the amplitude value, a beta value of the reproduced signal is set to an index.

3. An optical information recording method according to claim 1, wherein, as the information obtainable from the amplitude value, an asymmetry value of the reproduced signal is used.

4. An optical information recording method according to claim 1, wherein:

the zone where the linear velocity is low is a trial write zone provided on an inner periphery side of the optical disc; and the zone where the linear velocity is high is a trial write zone provided on an outer periphery side of the optical disc.

5. An optical information recording method according to claim 1, wherein the recording parameter includes a parameter representative of a recording power and a parameter representative of an erasing power.

6. An optical information recording apparatus for recording information onto a rewritable optical disc, which is used for information recording, in a manner that laser light is irradiated on a recording layer of the optical disc to thereby form marks thereon, the apparatus comprising:

a laser that generates laser light;

a laser driver that drives the laser in accordance with a predetermined recording parameter;

a motor that rotationally drives the optical disc at a predetermined rotational velocity;

a first parameter determining circuit that determines an optimal recording parameter of a record waveform in a zone of the optical disc where a linear velocity is low from a jitter value of a reproduced signal generated in a trial write;

a second parameter determining circuit that determines an optimal recording parameter of a record waveform in accordance with information obtainable from an amplitude value of a reproduced signal waveform generated in a trial write that is executed with a recording parameter determined from the result of a previous trial write executed at the linear velocity in a zone where linear velocity is low on the optical disc;

a third parameter determining circuit that determines an optimal recording parameter of a record waveform in the event of recording information into an arbitrary address position in a manner that a recording parameter is obtained through a predetermined calculation method from results of learning of optimal recording parameters on two or more zones of the optical disc where the linear velocities are different from one another; and a control circuit that controls the laser driver, the motor, and the first to third parameter determining circuits.

\* \* \* \* \*